2 Sheets--Sheet 1.

E. H. SMITH.

Sewing-Machines.

No. 5,388. Reissued April 29, 1873.

Witnesses

Edward Hill Johnson

Edward Hill Johnson

Inventor.

Charles H. Smith

By A. Q. Ainsworth Atty

THE NORRIS PETERS CO., PHOTO-LITHO., WASHINGTON, D. C.

E. H. SMITH.

Sewing-Machines.

2 Sheets--Sheet 2.

No. 5,388.

Reissued April 29, 1873.

Witnesses

Edward L. Osborn

Edward H. Johnson

Inventor.

Earle H. Smith

By L. S. Burgess Atty

THE NORRIS PETERS CO., PHOTO-LITHO., WASHINGTON, D. C.

UNITED STATES PATENT OFFICE.

EARLE H. SMITH, OF BERGEN HEIGHTS, NEW JERSEY.

IMPROVEMENT IN SEWING-MACHINES.

Specification forming part of Letters Patent No. 18,605, dated November 10, 1857; extended seven years; reissue No. 5,388, dated April 29, 1873; application filed January 29, 1872.

*To all whom it may concern:*

Be it known that I, EARLE H. SMITH, of the city of New York, now of Bergen Heights, in the county of Hudson and State of New Jersey, have invented certain Improvements in Sewing-Machines, of which the following is a specification:

*Nature and Objects of the Invention.*

My invention consists in a novel construction, combination, and arrangement of parts for operating the needle, shuttle, and feed, and controlling the thread, which have for their object a noiseless sewing-machine, as will be fully set forth hereafter.

*Description of the Drawing.*

Similar letters of reference indicate like parts in the drawing.

*General Description.*

Figure 1:
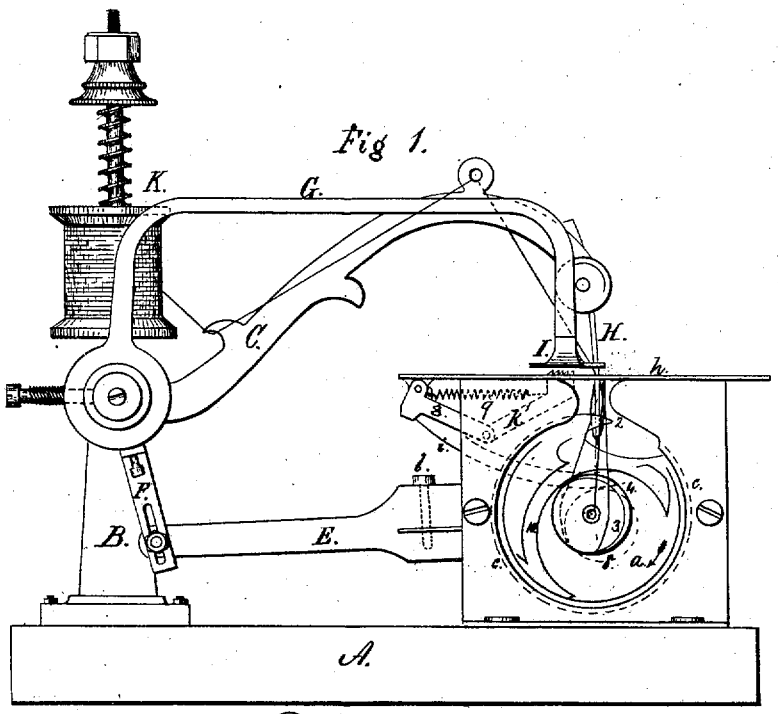
Figure 1 is a side elevation of the machine, showing the needle-arm, fixed arm, shuttle, and feeding device, the latter in dotted lines.

A represents the base of the machine, and B the uprights which support and form the bearings for the rocker-shaft D, upon which the needle-arm C vibrates. The necessary vibratory motion is given to the needle-arm by the connecting-rod E and an eccentric on the driving-shaft *f* of the machine; and the connection of the rod E and the slotted arm F secured to the horizontal shaft D is made by a bolt passing through the slot in the arm and a nut upon the end of the bolt, which holds the two in proper relation with each other, allowing them to be easily adjusted. The other end of the connecting-rod E, embracing the eccentric on the driving-shaft, is split for a short distance, as shown in Fig. 1, and the parts connected by the screw *l*, so that as the cam becomes worn the rod can be adjusted to compensate for the wear by the screw *l* drawing the parts together. The continuous motion of the driving-shaft gives a reciprocating motion to the needle H secured upon the end of the vibrating arm C. The horizontal driving-shaft *f* is held in bearings *m* rising from the base of the machine, and carries at its forward end the shuttle-driving mechanism. The shuttle has a cavity, 1, into which the bobbin *b* is inserted, and a nose is formed on the shuttle to catch the loop of thread from the needle. At the center of the shuttle is a projecting disk or button, 3, which momentarily arrests that portion of the loop of the needle-thread which passes in front of the shuttle and retains it until, by the operation of the machine, the loop is transferred to it from the body of the shuttle; and during the subsequent movements of the machine the loop is discharged from the detainer as it revolves, to be again taken up by the shuttle during the formation of the next stitch.

Figure 2:
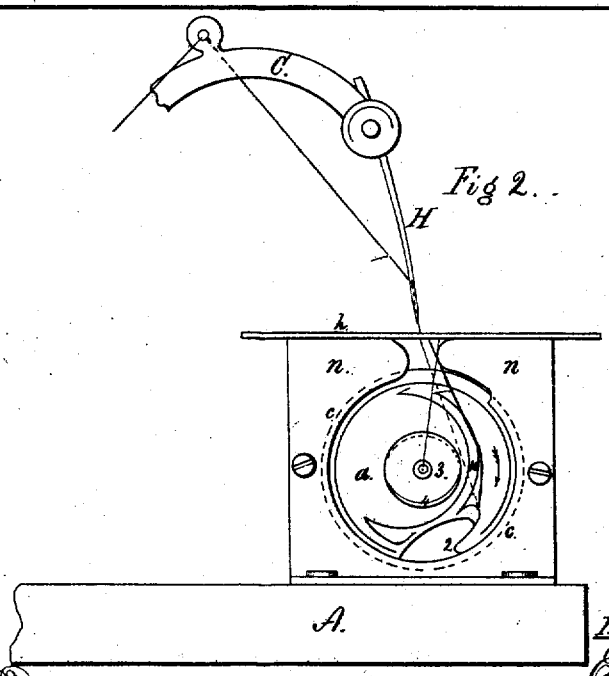
Figs. 2 and 3 show the shuttle in different positions in the process of forming the stitches.
Figure 3:
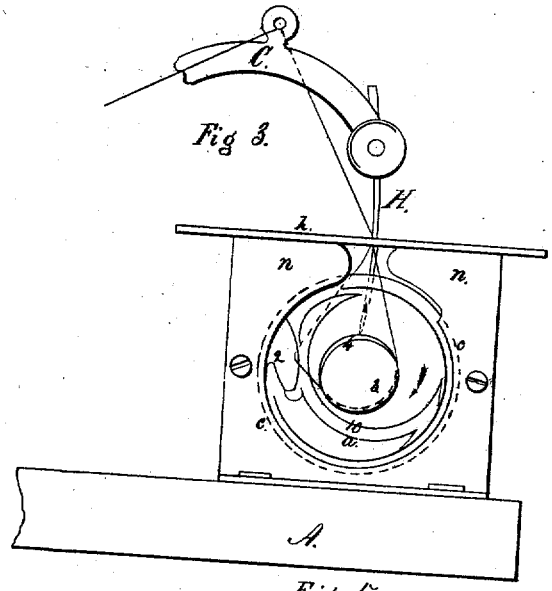
Figure 5:
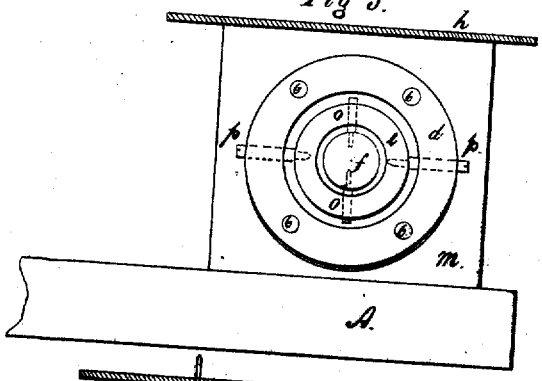
Fig. 5 shows the self-adjusting ring or disk with the projections on its face which drive the shuttle.
Figure 4:
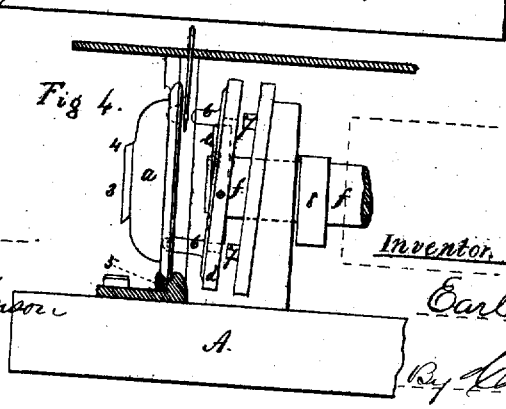
Fig. 4 is a sectional view of the shuttle and its bearings.
Figure 6:
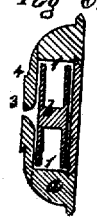
Fig. 6 is a sectional view of the shuttle and bobbin.

The shuttle is supported by the concentric ring or plate *n*, as shown, and is rotated in the groove cut in the edge of the ring or plate by the driving mechanism 1 secured upon the end of the shaft, the rings *d* and *e* forming a universal-joint mechanism which constantly accommodates itself to the face of the fixed guiding-bearing 7, Fig. 4, behind it, and, as this bearing 7, against which the inner face of the disk *d* revolves, is held in an inclined position at an angle to the plane of revolution of the shuttle, the driving-disks *d e* assume the same position with respect to the shuttle. Connection is made between the disks *d* and the shuttle by the pins 6 6 projecting from the face of the disk *d* at right angles to it, and fitting into the holes or depressions in the back of the shuttle, so that the rotation of the disks causes one or more of the pins 6 to engage with the shuttle at a time and rotate it. From the position in which the shuttle is held by the plate *n* with respect to the position in which the driving-disk *d* rotates it will be seen that but one or more of the pins 6 can be acting upon the shuttle at the same time, the others being removed from it, so that a space is left between the driving-disk and the shuttle sufficient for the operation of the needle and its loops of thread. The feed for moving the cloth forward upon the plate *h* consists of a lever, *k'*, actuated by a circular cam, 8. The upper end of this lever $k'$ is provided with a surface of points or teeth, which engage with the cloth to advance it a certain distance under the needle, and the lower end is pivoted to another lever hinged under the plate $h$, and having an arm or follower, $i$, which rests on the circular cam 8 on the driving-shaft $f$. The return movement of the lever $k'$ from the cloth is effected by the spring 9, as will readily be understood. The eccentric 8 and its follower $i$ cause the feed-lever to move upward and forward, to effect the feed, and the spring $g$ gives it the necessary backward and downward movement, disengaging the teeth from the cloth and returning to take a new stitch. These movements are imparted by the circular cam 8 in a gradual manner, the presser-foot, which is raised and lowered at each stitch, and the feed-dog following the movement of the eccentric, whereby the noise incident to actuating a reciprocating feed is obviated. The upper thread passes from the spool on the spindle K to the eye of the needle, and the lower thread is conducted from the bobbin $b$ through the aperture in the center of the shuttle. The loop of needle-thread through which the shuttle passes in forming each stitch is held under control, when not around the shuttle, by means of a circular "take-up" and "cast-off." It consists of a disk so formed and arranged as to draw the loop from the body of the shuttle and receive and hold the thread upon its periphery during a portion of the shuttle's movement, and also to cast it off and deliver it as required by the shuttle in the process of forming the next stitch. The movement of the thread, as manipulated by the thread-controller and shuttle, is illustrated in Figs. 1, 2, and 3. In Fig. 1 the point of the hook or shuttle is entering the loops of thread on the side of the needle. In Fig. 2 the loop is enlarged and seen passing over the body of the shuttle. In Fig. 3 the thread rests on the periphery of the take-up. and is seen in the act of leaving the body of the shuttle. In Fig. 1 a new stitch having been commenced, and the thread required for the shuttle delivered, the controller 3 throws off the thread by means of a chamfer, 4, on one side thereof, and forms sufficient slack for the shuttle in extending the loop.

It will thus be understood that the shuttle passes through the loop of needle-thread for each stitch, and that the thread-controller at each stitch takes the loop from the shuttle and discharges it to be drawn up into the material.

This machine differs from that patented to me April 14th, 1855, in this: That the circular thread-controller is capable, by reason of its shape, of taking up and manipulating a larger quantity of slack thread than in my said prior patent; and hence I am enabled to use a larger bobbin in the shuttle.

From the foregoing description it will be seen that I employ a reciprocating needle and a shuttle or hook having continuous, easy, and uniform movements. I avoid all vibrating thread-controllers, taking up the slack thread of the needle and controlling it by a rotary thread-controller in the process of forming stitches. The feeding-dog, which advances the cloth between each perforation of the needle for the stitches, is operated by a circular cam, so that there is no click or noise, and the shuttle is driven in a continuous, easy, and noiseless manner.

These elements or parts co-operating together, produce a sewing-machine capable of operating without noise, easily worked, and capable of rapid operation, which are features of great importance to the users of sewing-machines.

*Claims.*

1. The combination, with the shuttle, of a revolving needle-thread detainer and cast off to receive, control, and deliver loops of needle thread from and to the shuttle, substantially in the manner described and specified.

2. The combination, with a reciprocating needle, of a revolving-shuttle, thread-detainer, and cast-off, constructed and operating substantially in the manner described and specified.

3. A reciprocating needle operated by a continuous rotary movement, a rotary shuttle, a rotary thread-controller, (constructed as described,) and a feeding-dog, operated by a circular cam, all combined and arranged in co-operative relation with each other and producing a noiseless sewing-machine, substantially in the manner described and specified.

EARLE H. SMITH.

Witnesses:

EDWARD E. OSBORN,
EDWARD H. JOHNSON.